United States Patent Office 3,392,031
Patented July 9, 1968

3,392,031
REARRANGEMENT OF LARD
John E. Thompson, 908 Burns Ave.,
Flossmoor, Ill. 60422
No Drawing. Continuation-in-part of application Ser. No. 202,396, June 14, 1962. This application Aug. 4, 1964, Ser. No. 387,514
3 Claims. (Cl. 99—118)

ABSTRACT OF THE DISCLOSURE

Lard containing 0.025 to 0.1% water is interesterified in the presence of an anhydrous dehydrating salt, sodium or magnesium sulfate, using a reduced amount of catalyst.

---

This application is a continuation-in-part of applicant's prior application S.N. 202,396, filed June 14, 1962, which has been abandoned in favor of this application.

This invention relates to the rearrangement of lard with metal alcoholates and more in particular it relates to an improvement in the well known rearrangement process comprising a method of removing water from the lard.

Heretofore, it has been the practice to vacuum dry lard or other fats or oils before rearrangement. If there is a small amount of moisture present in the lard, in the neighborhood of 0.025% to 0.1%, the lard may be rearranged using an excess of sodium methoxide, the excess reacting with the water which leads to undesirable results, because sodium methoxide is expensive and increases the cost of the process and also the hydrolysis product of sodium methoxide leads to the production of soap which can cause an emulsion to form during the process, which emulsion is highly undesirable.

Modified lard has been produced by treating lard with metal alcoholates which comprise treating the anhydrous lard, usually vacuum flash dried, with sodium methoxide or its equivalent material at a temperature between that necessary to keep the lard in liquid phase and at about 50° C. This process is clearly set forth in the Vander Wal et al. Patent No. Re. 23,499, the Holman et al. Patent No. 2,875,066 and in the Van Akkeren Patent No. 2,872,463.

It is an object of the present invention to provide a method of dehydrating lard prior to metal alcoholate rearrangement.

It is also an object of the present invention to provide a dehydrating process that is simple in its operation and does not require expensive equipment.

It is a further object of the invention to provide a material that when added to the lard will remove the water therefrom in such a manner as not to interfere with the alkali metal rearrangement.

It is a still further object of this invention to provide a dehydrating material that when added to the lard will be soluble in, and that can be removed by, the water that is added to terminate the rearrangement reaction.

The various features of novelty which characterize this invention are pointed out with particularity in the claims annexed to and forming part of this specification. For a better understanding of the invention, however, its advantages and specific objects obtained by its use, reference should be had to the various examples and descriptive matter in which have been presented a preferred embodiment of the invention.

Lard was rearrangement using sodium methoxide or metallic sodium as the catalyst. The lard was collected directly from the manufacturing process at a temperature of 120° C. to 150° C. It was allowed to cool to 50° C. and contained 0.1% water. Fresh sodium methoxide or metallic sodium dispersions were used to ensure optimum results.

Anhydrous sodium sulphate was heated at 125° C. for 2 hours prior to use. All of the rearrangement reactions were run for 1 hour with agitation at 50° C. and then the sodium methoxide or the metallic sodium, and the sodium sulphate were removed by adding water.

The congeal point and differential cooling curves are excellent indicators of the extent of the rearrangement. A congeal point of less than 3° C. is considered to be satisfactory. The differential cooling curves are referred by Wiedmann et al., Journal of the American Oil Chemists' Society, vol. 38, pp. 389–395 (1961).

In the following examples 500 parts of lard were used in all of the reactions.

Example 1

With 500 parts of lard 3.96 parts of sodium methoxide were added. 1.45 parts were used to neutralize the water and 2.5 or 0.5% were used to catalyze the reaction. After 1 hour the reaction was terminated by adding 20 parts of water.

Example 2

2.29 parts of sodium methoxide were added to 500 parts of lard. 1.46 parts were used to neutralize the water and 0.83 part or 0.17% were used to catalyze the reaction. After 1 hour the reaction was terminated by adding 20 parts of water.

Example 3

10 parts of anhydrous sodium sulphate were added to 500 parts of lard, mixed for 10 minutes and filtered. 2.29 parts of sodium methoxide were added, as in Example 2. After 1 hour the reaction was terminated by adding 20 parts of water.

Example 4

To the 500 parts of lard, 10 parts of anhydrous sodium sulphate were added, mixed for 10 minutes (allowed to remain in the reaction mixture), and then 2.29 parts of sodium methoxide were added, as in Example 2. After 1 hour the reaction was terminated by adding 20 parts of water.

Example 5

To 500 parts of lard, containing 0.025 to 0.1 part of water, 10 parts of anhydrous sodium sulphate were mixed for 10 minutes, then 2 parts of metallic sodium—finely dispersed—in lard were added as a rearrangement catalyst. After one hour the reaction was terminated by adding 20 parts of water.

The results are presented in the following table:

|   | Amount of lard, parts | Amount of $H_2O$ parts | Amount of $Na_2SO_4$ parts | Amount of NaOMe or Na, parts | Congeal Point, °C |
|---|---|---|---|---|---|
| Undeodorized Lard | | | | | 16.6 |
| Deodorized Lard | | | | | 14.4 |
| 1 | 500 | 0.5 | | 3.96 | 3 |
| 2 | 500 | 0.5 | | 2.29 | 13.8 |
| 3 | 500 | 0.5 | 10 | 2.29 | 3 |
| 4 | 500 | 0.5 | 10 | 2.29 | 3 |
| 5 | 500 | 0.5 | 10 | 2 | 3 |

NOTE.—Refractive index readings in all seven cases were the same—1.4546.

It is quite apparent that anhydrous sodium sulphate may be used to dehydrate the fat so that a minimum amount of sodium methoxide may be used and that it is not necessary to remove the sodium sulphate before adding the catalyst.

While in the above examples the rearrangement reaction is terminated by the addition of water, a dilute acid may also be used, such as phosphoric acid, hydrochloric acid, etc.

While in the above examples anhydrous sodium sulphate was used as a dehydrating agent, other materials may be used, such as magnesium sulphate. These dehydrating agents must be so inert that they may remain in the reaction chamber during the rearrangement and they must be easily removed, preferably as a solution with the water or dilute acid, that is added to terminate the rearrrangement reaction. They must be effective at the temperature necessary to maintain the fatty material in a molten condition, that is 105° F., or higher. The dehydrating agent must not be capable of promoting an undesirable reaction, such as copper sulphate, which is a powerful pro-oxidant, which promotes rancidity at a level of one part per billion. They must not be reactive with the lard, such as sodium hydroxide, which would promote hydrolysis. The dehydrating agent must not be toxic or dangerous as would phosphorus pentoxide or concentrated sulfuric acid and must not be reactive with a metallic methoxide catalyst, thus eliminating any of the acid materials. Calcium chloride is not sufficiently active at the temperature of the reaction to remove the water, that is calcium chloride does not have a greater affinity for the water than does the metallic methoxide catalyst. Silica gel is not water soluble so that it may be removed from the solution.

While in the above examples sodium methoxide was used as a catalyst, other metal salts of an alcohol, containing less than 5 carbon atoms and less than 3 hydroxy groups may be used. The preferred material is an alkali metal salt of a monohydroxy alkane of which sodium methoxide is the material used in Examples 1 to 4. Metallic sodium dispersions may also be used for the interesterification or rearrangement reaction. Example 5 uses two parts of metallic sodium.

The use of at least 2% of a solid dehydrating agent that is water soluble as set forth above, has the advantage of greatly reducing the quantity of the sodium methoxide catalyst needed for complete rearrangement. No filtering is necessary prior to adding the catalyst and the use of water to terminate the reaction removes both the catalyst and the dehydrating agent. Of course, the use of a solid dehydrating agent allows the use for the first time of the fat that has not been vacuum dried or subjected to other prior drying steps.

What is claimed is:
1. A process for modifying lard, wherein lard containing 0.025% to 0.1% of water is
   (a) dehydrated in a molten condition with at least 2% of an anhydrous dehydrating salt selected from the group consisting of sodium sulphate and magnesium sulphate,
   (b) admixing the lard with an interesterification catalyst selected from the group consisting of an alkali metal dispersion and an alkali metal salt of an alcohol containing less than 5 carbon atoms and less than three hydroxy groups,
   (c) heating the mixture to a temperature of at least 50° C. for a length of time sufficient to produce the rearrangement,
   (d) terminating the reaction by the addition of water thereto, and
   (e) removing the solution of anhydrous salt, the water and the decomposition products of the alkali metal catalyst.
2. The process of claim 1, wherein said dehydrating salt is anhydrous sodium sulphate.
3. The process of claim 1, wherein said dehydrating salt is anhydrous magnesium sulphate.

References Cited
UNITED STATES PATENTS

| | | | |
|---|---|---|---|
| 2,614,937 | 10/1952 | Baur et al. | 99—118 |
| 2,727,913 | 12/1955 | Kuhrt et al. | 260—410.7 |
| 2,875,066 | 2/1959 | Holman et al. | 260—410.7 |

MAURICE W. GREENSTEIN, *Primary Examiner.*

HENRY R. JILES, *Examiner.*